(12) United States Patent
Lee et al.

(10) Patent No.: US 7,733,829 B2
(45) Date of Patent: Jun. 8, 2010

(54) METHOD AND APPARATUS FOR REGISTERING MOBILE NODE IN A WIRELESS LOCAL AREA NETWORK (LAN) ENVIRONMENT

(75) Inventors: Min-ho Lee, Seoul (KR); Young-keun Kim, Incheon Metropolitan (KR); Pyung-soo Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1212 days.

(21) Appl. No.: 11/221,259

(22) Filed: Sep. 8, 2005

(65) Prior Publication Data
US 2006/0182104 A1  Aug. 17, 2006

(30) Foreign Application Priority Data
Feb. 14, 2005  (KR) ............ 10-2005-0011911

(51) Int. Cl.
*H04W 4/00* (2009.01)
(52) U.S. Cl. .................. 370/331; 455/435.1
(58) Field of Classification Search ............ None
See application file for complete search history.

(56) References Cited

U.S. PATENT DOCUMENTS

| | | | |
|---|---|---|---|
| 6,473,413 B1 | 10/2002 | Chiou et al. | |
| 6,535,493 B1 | 3/2003 | Lee et al. | |
| 6,771,609 B1 * | 8/2004 | Gudat et al. | 370/254 |
| 6,947,401 B2 * | 9/2005 | El-Malki et al. | 370/331 |
| 6,970,459 B1 * | 11/2005 | Meier | 370/389 |
| 7,039,404 B2 * | 5/2006 | Das et al. | 455/435.1 |
| 7,162,529 B2 * | 1/2007 | Morishige et al. | 709/230 |
| 7,263,371 B2 * | 8/2007 | Das et al. | 455/456.1 |
| 7,308,506 B1 * | 12/2007 | Evans | 709/245 |
| 7,313,631 B1 * | 12/2007 | Sesmun et al. | 709/245 |
| 7,394,802 B2 * | 7/2008 | Jun et al. | 370/350 |
| 2001/0036184 A1 * | 11/2001 | Kinoshita et al. | 370/389 |
| 2001/0053694 A1 * | 12/2001 | Igarashi et al. | 455/433 |
| 2002/0143990 A1 | 10/2002 | Turunen | |
| 2002/0147837 A1 | 10/2002 | Heller | |

(Continued)

FOREIGN PATENT DOCUMENTS

EP  1 322 090 A2  6/2003

(Continued)

OTHER PUBLICATIONS

Search Report issued in European Patent Application No. 05257176.7 on Jun. 28, 2006.

(Continued)

*Primary Examiner*—Phirin Sam
(74) *Attorney, Agent, or Firm*—Staas & Halsey LLP

(57) ABSTRACT

An apparatus and method for supporting mobility of a mobile terminal in a wireless local area network (LAN) environment deploying mobile IP are provided. The method for registering a mobile node using a virtual mobile node comprises: detecting whether or not a mobile node traveling among a plurality of networks is connected; and registering information on the mobile node whose connection is detected, with an agent relaying communication between the mobile node and a correspondent agent. By doing so, even when a mobile IP module is not installed, the mobile node can perform wireless communication seamlessly between networks in a wireless LAN environment deploying mobile IP.

30 Claims, 7 Drawing Sheets

U.S. PATENT DOCUMENTS

| | | | |
|---|---|---|---|
| 2003/0021253 A1* | 1/2003 | Jung | 370/338 |
| 2003/0031151 A1 | 2/2003 | Sharma et al. | |
| 2003/0123421 A1* | 7/2003 | Feige et al. | 370/338 |
| 2003/0235176 A1 | 12/2003 | Zhang et al. | |
| 2004/0029555 A1 | 2/2004 | Tsai et al. | |
| 2004/0063402 A1* | 4/2004 | Takeda et al. | 455/41.1 |
| 2004/0165594 A1* | 8/2004 | Faccin et al. | 370/395.2 |
| 2004/0176095 A1* | 9/2004 | Yamada et al. | 455/445 |
| 2004/0240445 A1* | 12/2004 | Shin et al. | 370/389 |
| 2004/0259545 A1* | 12/2004 | Morita | 455/435.1 |
| 2005/0177647 A1* | 8/2005 | Anantha et al. | 709/249 |
| 2006/0126582 A1* | 6/2006 | Saifullah et al. | 370/338 |
| 2006/0140150 A1* | 6/2006 | Olvera-Hernandez et al. | 370/331 |
| 2007/0025312 A1* | 2/2007 | Smith | 370/338 |

FOREIGN PATENT DOCUMENTS

| | | |
|---|---|---|
| KR | 2003-52773 | 6/2003 |
| KR | 2003-77817 | 10/2003 |

OTHER PUBLICATIONS

Perkins, Charles, et al. "IMPH: a Mobile Host Protocol for the Internet." *Computer Networks and ISDN Systems.* Amsterdam, Netherlands. vol. 27, No. 3, Dec. 1994 (pp. 479-491).

Perkins, Charles. "RFC 2002: IP Mobility Support." *IETF.* Oct. 1996 (pp. 1-51).

* cited by examiner

FIG. 5

| NUMBER | ATTRIBUTE | MAC ADDRESS | COA | HOME ADDRESS | HA ADDRESS | TIME STAMP |
|---|---|---|---|---|---|---|
| 1 | HS | 00:40:05:36:8D:01 | X | 192.168.0.1 | 192.168.0.0 | 20050101/00:00 |
| 2 | HD | 00:40:05:36:8D:02 | X | 192.168.0.2 | 192.168.0.0 | 20050102/01:00 |
| 3 | HS | 00:40:05:36:8D:03 | X | 192.168.0.3 | 192.168.0.0 | 20050102/02:00 |
| 4 | FO | 00:40:05:36:8D:04 | 192.168.0.4 | 192.168.10.1 | 192.168.10.0 | 20050101/03:00 |
| 5 | FO | 00:40:05:36:8D:05 | 192.168.0.5 | 192.168.10.2 | 192.168.10.0 | 20050101/04:00 |
| ... | ... | ... | ... | ... | ... | ... |

METHOD AND APPARATUS FOR REGISTERING MOBILE NODE IN A WIRELESS LOCAL AREA NETWORK (LAN) ENVIRONMENT

CROSS-REFERENCE TO RELATED APPLICATIONS

This application claims all benefits under 35 U.S.C. §119 of Korean Patent Application No. 2005-11911, filed on Feb. 14, 2005, in the Korean Intellectual Property Office, the disclosure of which is incorporated by reference herein.

BACKGROUND OF THE INVENTION

1. Field of the Invention

The present invention relates to a wireless local area network (LAN) deploying mobile internet protocol (IP), and more particularly, to an apparatus and method for supporting mobility of a mobile terminal.

2. Related Art

As mobile terminals such as mobile phones, notebook PCs, and personal digital assistants (PDAs) become more popular and widely utilized, development has focused on allowing users to use mobile terminals to access the Internet from anywhere and to enable mobile terminals to communication with each other and/or other computers, fixed and mobile. In particular, many researches have been conducted regarding technology capable of providing seamless communication when a mobile terminal travels among a plurality of networks without restarting its applications and without disrupting any ongoing communications. An example of this technology is known as mobile internet protocol (IP) which is an Internet standards-track protocol used to provide node mobility in the Internet and to define how digital information (which can be grouped into bundles called "packets") is exchanged between two or more mobile terminals in the Internet.

FIG. 1 is a diagram showing the structure of an example wireless local area network (LAN) environment deploying mobile IP.

Referring to FIG. 1, the wireless LAN environment deploying mobile IP includes a mobile node (MN) 11, a home agent (HA) 12, a foreign agent (FA) 13, and a correspondent node (CN) 14 connected, via a distribution system such as the Internet.

The mobile node (MN) 11 is a host traveling among a plurality of networks. A network to which the mobile node (MN) 11 is first connected is referred to as a "home network", and the IP address of the mobile node (MN) 11 in the home network is referred to as a "home address." Such a mobile node (MN) 11 can change its point-of-attachment to the Internet from one network to another while maintaining any ongoing communications and using only its IP home address.

The home agent (HA) 12 is a router having information on the mobile node (MN) 11, situated in the home network of the mobile node (MN) 11. In particular, when the mobile node (MN) 11 moves out of the home network and is positioned in a foreign network, the home agent (HA) 12 relays the communication between the mobile node (MN) 11 and the correspondent node (CN) 14 based on this information.

The foreign agent (FA) 13 is a router which is connected to the mobile node (MN) 11 when the mobile node (MN) 11 moves out of the home network, and is positioned in a foreign network. The IP address of the mobile node (MN) 11 in the foreign network is referred to as a "care of address" (COA). The correspondent node (CN) 14 can be a host, or a client station, communicating with the mobile node (MN) 11.

Referring to FIG. 1, the operations of the wireless LAN environment deploying mobile IP will now be described as follows.

In operation 1, the mobile node (MN) 11 moves out of the home network into a foreign network. In operation 2, the foreign agent (FA) 13 broadcasts an agent advertisement including network information.

In operation 3, the mobile node (MN) 11 receives the agent advertisement broadcast by the foreign agent (FA) 13, when moved into the foreign network, and based on the network information included in the agent advertisement, detects that it is located in a foreign network. Also, the mobile node (MN) 11 obtains a COA, binds the home address and the COA of the mobile node (MN) 11, and registers the binding result in the home agent (HA) 12.

In operation 4, the home agent (HA) 12 transmits a response to the registration requested from the mobile node (MN) 11.

In operation 5, the correspondent node (CN) 14 transmits packets with a destination set to the home address of the mobile node (MN) 11.

In operation 6, the home agent (HA) 12 intercepts all packets destined to the home address of the mobile node (MN) 11, and by setting the COA of the mobile node (MN) 11 as the new destination of the packets, performs tunneling of packets to the mobile node (MN) 11 at its current location, i.e., to the COA of the mobile node 11.

As described above, in order to deploy mobile IP, routers such as the home agent (HA) 12 and the foreign agent (FA) 13 must support the mobile IP, and each mobile node (MN) must include a separate mobile IP module. When an office is built for networking, for example, the router is one of a small number of infrastructure facilities, which can be easily installed to support the mobile IP. However, there are many types of user terminals and network products, and users are usually reluctant to install additional functions that may affect the operation of existing functions. As a result, it can be very difficult to install a mobile IP module in every mobile node.

Because of this problem, the mobile IP has not been widely used, and therefore, new network products have been introduced to provide WLAN services to mobile nodes do not have the mobile IP function. An example of these network products is a WLAN switch from Airespace, Inc., as shown in FIG. 2.

FIG. 2 is a diagram showing the structure of a wireless LAN environment in which typical WLAN switches are installed to monitor the movement of a mobile node between different networks.

Referring to FIG. 2, the wireless LAN environment in which the WLAN switch is installed includes a mobile node 21, general hosts 22, 23, 24, and 26, access points ("APs") 24 and 27, WLAN switches 28 and 29, and data sensor switches 210 and 211 located in different networks, i.e., a first wireless LAN or a second wireless LAN.

The MAC address of the mobile node 21 is registered in advance in the WLAN switches 28 and 29. The WLAN switches 28 and 29 are connected to the first wireless LAN and the second wireless LAN, respectively, to detect the movement of the mobile node 21 by referring to the MAC address and perform tunneling between the WLAN switches 28 and 29.

However, even when the WLAN switches are used, supporting the mobility of the mobile node 1 can only be made possible in an area in which a device such as the WLAN switch is installed, and can not be made possible in other types of WLAN environments, such as, Bluetooth. Moreover, it is very inconvenient to register the MAC address of the mobile node 21 in advance in the WLAN switches 28 and 29.

Accordingly, there is a need to create a wireless LAN environment deploying mobile IP in which a mobile node can travel among a plurality of networks while maintaining any ongoing communications seamlessly, even when a mobile IP module is not installed therein.

SUMMARY OF THE INVENTION

Various aspects and example embodiments of the present invention advantageously provide an apparatus and method for enabling a mobile node to perform wireless communication seamlessly even under an environment in which a mobile IP module is not installed in the mobile node.

According to an aspect of the present invention, a method for registering a mobile node, via a virtual mobile node, is provided for operation in wireless networks. Such a method comprises: detecting whether a mobile node traveling among a plurality of networks is connected; and registering information on the mobile node whose connection is detected, in an agent relaying communication between the mobile node and a correspondent agent located in one of the networks.

According to another aspect of the present invention, an apparatus for registering a mobile node is provided for operation in wireless networks. Such an apparatus comprises: a detection unit which detects whether a mobile node traveling among a plurality of networks is connected; and a registration unit which registers information on the mobile node whose connection is detected by the detection unit, with an agent relaying communication between the mobile node and a correspondent agent located in one of the networks.

The information on the mobile node includes an internet protocol (IP) address in a home network of the mobile node, and an IP address in a foreign network, such that the agent relaying communication can perform tunneling of packets with a destination set to the IP address in the home network by the correspondent agent, by setting the IP address in the foreign network as the destination. The registration unit can bind the IP address in the home network and the IP address in the foreign network of the mobile node, and register the binding result, on behalf of the mobile node.

The detection unit detects whether the mobile node is connected, based on a packet transmitted by an access point connecting the mobile node and the agent or by the mobile node. For example, the detection unit can detect whether the mobile node is connected, using a logical link control (LLC) packet transmitted by the access point, an address resolution protocol (ARP) packet, or an internet control message protocol (ICMP) packet transmitted by the mobile node.

In addition, a retrieval unit is provided to search a cache for information on the mobile node whose connection is detected by the detection unit. The registration unit can then register the information on the mobile node retrieved by the retrieval unit with the agent relaying communication between the mobile node and the correspondent agent located in one of the networks. Similarly, a request unit is further provided to request the information from a plurality of nodes located on the networks, if the information is not retrieved by the retrieval unit. The registration unit can then register information on the mobile node included in a response to the request by the request unit with the agent relaying communication between the mobile node and the correspondent agent located in one of the networks. Further, a waiting unit is also provided to wait until the information is obtained, if there is no response to the request by the requesting unit. The registration unit can then register information obtained as a result of the waiting by the waiting unit with the agent relaying communication between the mobile node and the correspondent agent located in one of the networks.

According to still another aspect of the present invention, there is provided a computer readable recording medium having embodied thereon a computer program for executing the method for registering a mobile node for operation in wireless networks which comprises detecting whether a mobile node traveling among a plurality of networks is connected; and registering information on the mobile node whose connection is detected, with an agent relaying communication between the mobile node and a correspondent agent located in one of the networks.

In addition to the example embodiments and aspects as described above, further aspects and embodiments of the present invention will be apparent by reference to the drawings and by study of the following descriptions.

BRIEF DESCRIPTION OF THE DRAWINGS

A better understanding of the present invention will become apparent from the following detailed description of example embodiments and the claims when read in connection with the accompanying drawings, all forming a part of the disclosure of this invention. While the following written and illustrated disclosure focuses on disclosing example embodiments of the invention, it should be clearly understood that the same is by way of illustration and example only and that the invention is not limited thereto. The spirit and scope of the present invention are limited only by the terms of the appended claims. The following represents brief descriptions of the drawings, wherein:

FIG. 5 is a diagram showing an example data storage format of an MN information cache according to an embodiment of the present invention;

DETAILED DESCRIPTION OF THE INVENTION

The present invention is applicable for use with all types of wireless communication devices and wireless networks, including, for example, wireless personal area networks (PANs), wireless local area networks (LANs) such as Wi-Fi networks, Bluetooth, ultra-wideband networks, and wireless metropolitan area networks (MANs) and compatible wireless application protocols usable for wireless transmission as specified by IEEE 802.11a, 802.11b and/or 802.11g standards, Bluetooth standards, other emerging wireless technologies such as Wi-Max, which is a pumped-up version of Wi-Fi and stands for worldwide interoperability for microwave access, where users will be able to access the Internet with wireless cards from within a range of 30 miles rather than 300 feet, at speeds far greater than cable modems, or even mobile cellular networks supporting an even wider range of coverage. However, for the sake of simplicity, discussions will concentrate mainly on exemplary use of several configurations and arrangement systems of mobile nodes (MNs), virtual mobile nodes (VMNs), access points (APs) and client stations in a wireless LAN environment, although the scope of the present invention is not limited thereto.

Figure 3:
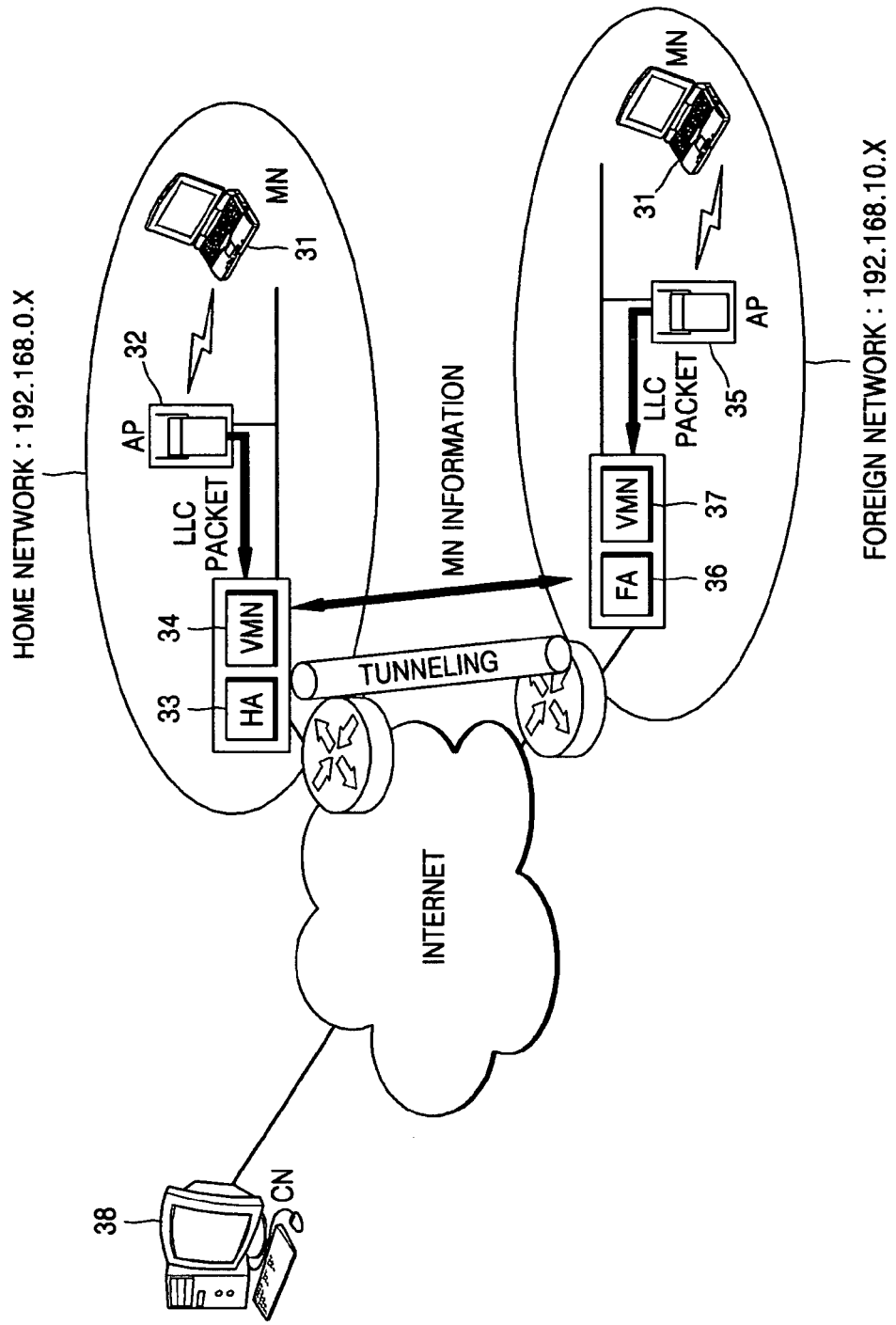
FIG. 3 is a diagram showing the structure of a wireless LAN environment deploying mobile IP according to an example embodiment of the present invention.

Turning now to FIG. 3, a wireless LAN environment according to an embodiment of the present invention is illustrated. Referring to FIG. 3, the wireless LAN environment deploying mobile IP includes a mobile node (MN) 31, an access point (AP) 32, a home agent (HA) 33, a virtual mobile node (VMN) 34, an access point (AP) 35, a foreign agent (FA) 36, a virtual mobile node (VMN) 37, and a correspondent node (CN) 38 connected, via a distribution system such as the Internet. The virtual mobile nodes (VMN) 34 and 37 represent nodes which support only the mobile IP function of the mobile node (MN) 31. Wireless access point (AP) 32 or 35 may serve a central connection that allows a number of mobile nodes (i.e., mobile terminals such as notebook PCs, PDAs and mobile phones) to wirelessly connect to a network that is either created by an access point (AP) or a client station without having dedicated cables, and communicate according to the IEEE 802.11(a), 802.11(b) and/or 802.11(g) standards for a wireless local area network (LAN). Radio signals transmitted between the access point (AP) 32 or 35 and the mobile node (MN) 31 can be unidirectional or bidirectional in the wireless domain to comply with, for example, frequencies of the 2.4-5 GHz bands as dictated by IEEE 802.11a, 802.11b and/or 802.11g standards for a wireless LAN.

Figure 1:
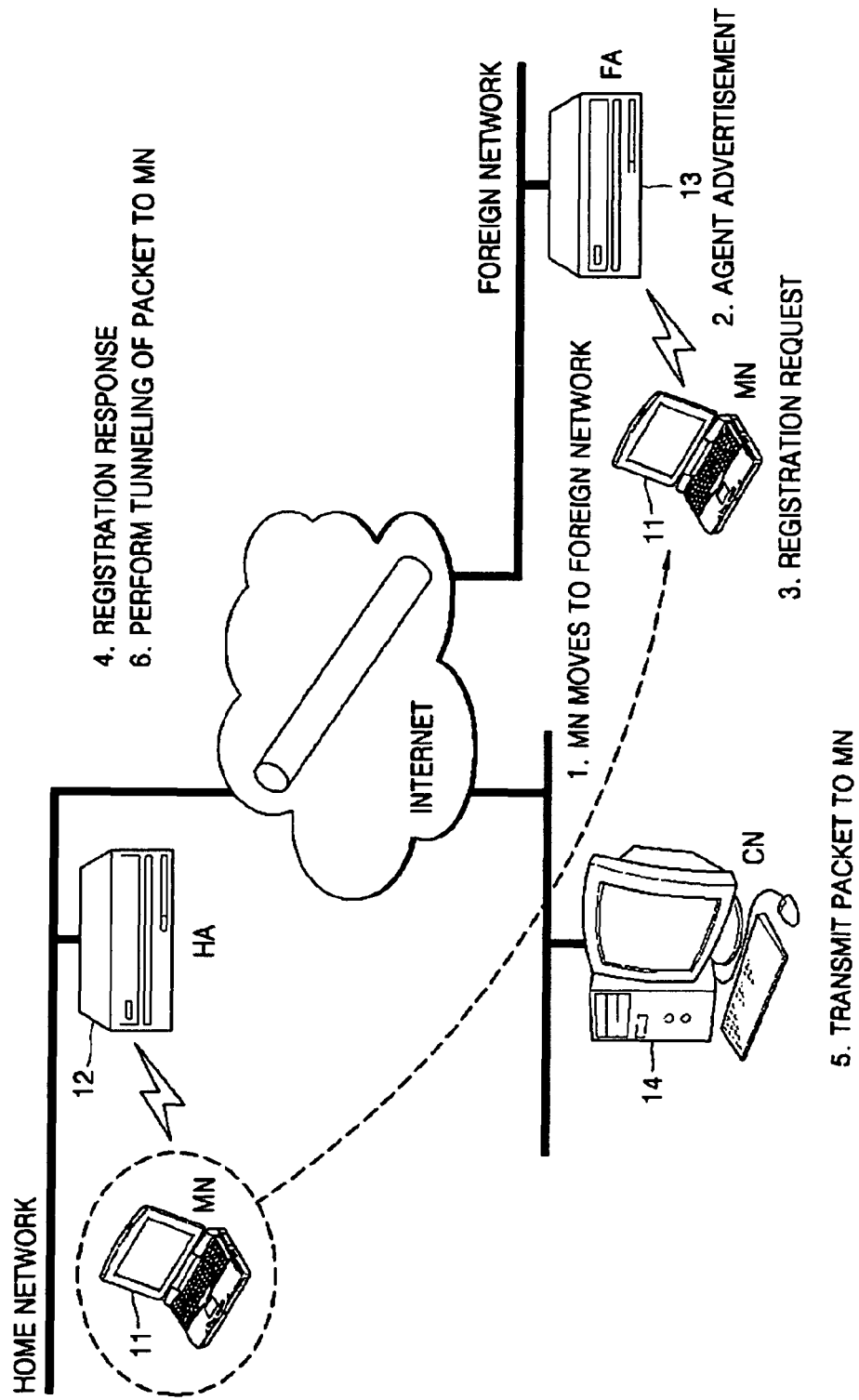
FIG. 1 is a diagram showing the structure of a wireless local area network (LAN) environment deploying mobile IP.
Figure 2:
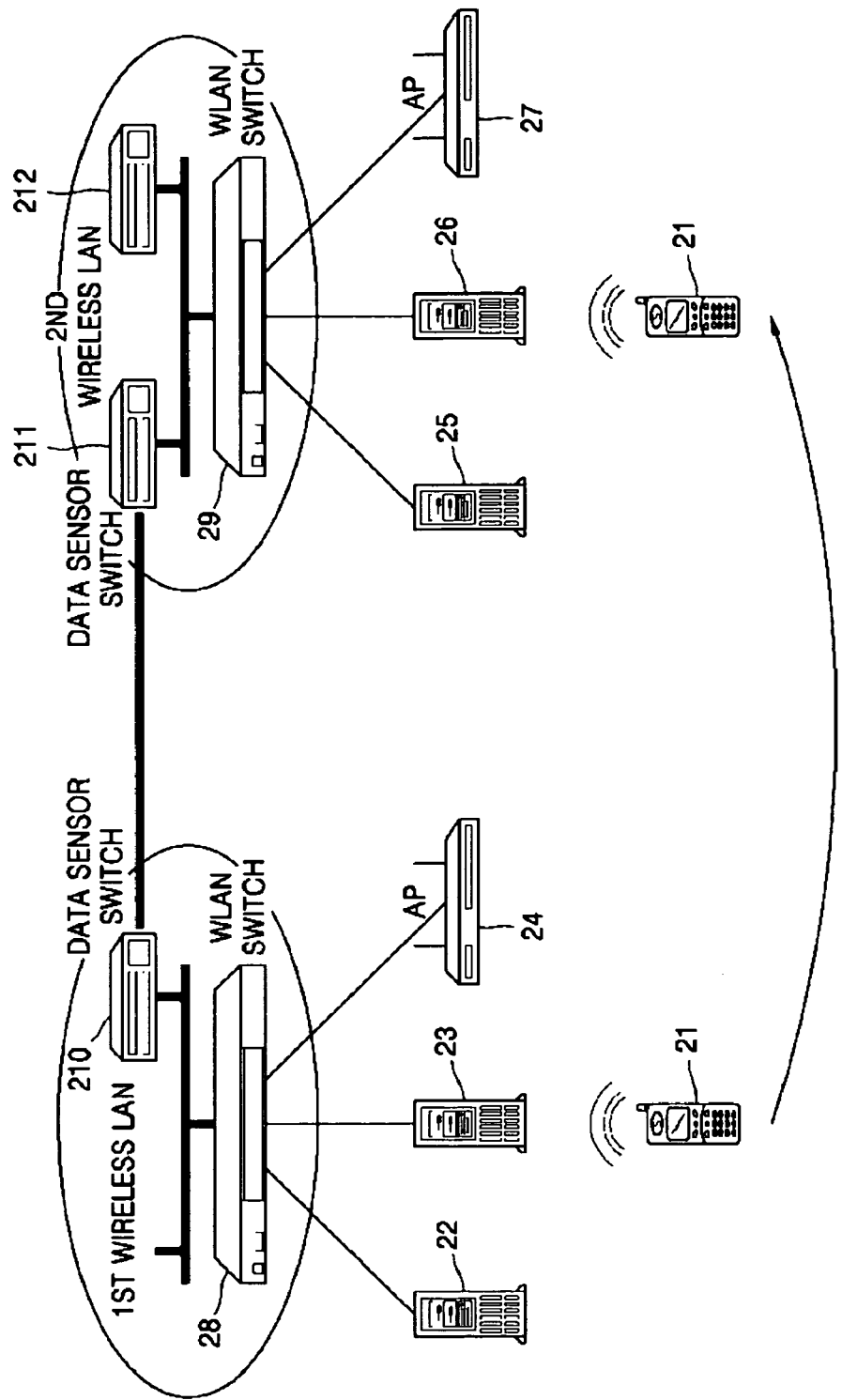
FIG. 2 is a diagram showing the structure of a wireless LAN environment in which WLAN switches are installed.

As shown in FIG. 3, the virtual mobile nodes (VMNs) 34 and 37 may be installed in the same node as the home agent (HA) 33 or the foreign agent (FA) 36, or may be installed separately in another node in either a home network or a foreign network within the wireless LAN environment. The wireless LAN environment according to an embodiment of the present embodiment can be similar or the same to that shown in FIG. 1 and FIG. 2 utilizing the mobile IP, except that the virtual mobile nodes (VMNs) 34 and 37 are additionally installed.

The mobile node (MN) 31 is a host which travels among a plurality of networks. A network to which the mobile node (MN) 31 is first connected is referred to as a "home network", and the IP address of the mobile node (MN) 31 in the home network is referred to as a "home address". Such a mobile node (MN) 11 can change its point-of-attachment to the Internet, that is, its location from one network to another without changing its IP home address and without interrupting any ongoing communications. The home address remains fixed as the mobile node (MN) 11 moves throughout the Internet.

The home agent (FA) 33 is a router which has information on the mobile node (MN) 31, located in the home network of the mobile node (MN) 31. In particular, when the mobile node (MN) 31 moves out of the home network and is positioned in a foreign network, the home agent (HA) 33 relays the communication between the mobile node (MN) 31 and the correspondent node (CN) 38 based on this information.

The foreign agent (FA) 36 is a router which is connected to the mobile node (MN) 31 when the mobile node (MN) 31 moves out of the home network, and is positioned in a foreign network. The IP address of the mobile node (MN) 31 in the foreign network is referred to as a "care of address" (COA).

The correspondent node (CN) 38 can be a host, or a client station communicating with the mobile node (MN) 31. As shown in FIG. 3, an IP address of the home network can be assigned, for example, at 192.168.9.X, and an IP address of the foreign network can be assigned, for example, at 192.168.10.X.

The home agent (HA) 33 and the foreign agent (FA) 36 can be software products that run on routers, or in host computers (e.g., PCs and workstations). The mobile node is typically a host that is highly portable, such as a notebook PC, a PDA or a mobile phone. All three entities—mobile node (MN), home agent (HA) and foreign agent (FA) can be implemented and simultaneously operating on a single node.

According to an embodiment of the present embodiment, when the mobile node (MN) 31 first attempts to access the home network, the virtual mobile node (VMN) 34 first registers the IP address of the mobile node (MN) 31 as a home address, in the home agent (HA) 33 on behalf of the mobile node (MN) 31. Also, when the mobile node (MN) 31 moves out of the home network and into a foreign network, the virtual mobile node (VMN) 34 binds the home address and the COA of the mobile node (MN) 31 and registers the binding result in the home agent (HA) 33 on behalf of the mobile node (MN) 31.

Figure 4:
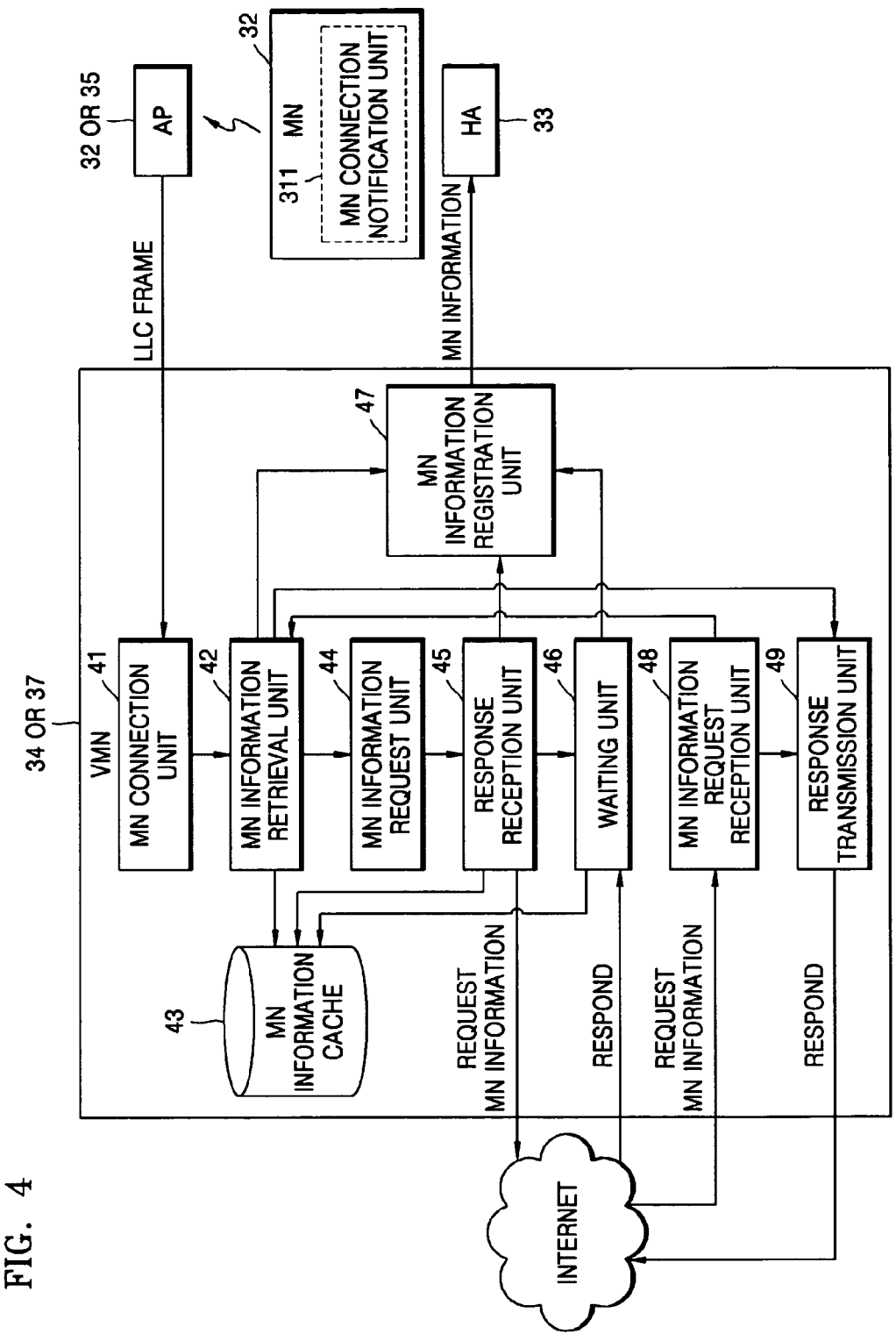
FIG. 4 is a diagram showing the structure of an example virtual mobile node according to an embodiment of the present invention.

FIG. 4 is a diagram showing the structure of an example virtual mobile node (VMN) 34 or 37 according to an embodiment of the present invention.

Referring to FIG. 4, the virtual mobile node (VMN) 34 installed in the home network, or the virtual mobile node (VMN) 37 installed in the foreign network according to an embodiment of the present embodiment includes an MN connection detection unit 41, an MN information retrieval unit 42, an MN information cache 43, an MN information request unit 44, a response reception unit 45, a waiting unit 46, an MN information registration unit 47, an MN information request reception unit 48, and a response transmission unit 49.

The MN connection detection unit 41 detects whether or not the mobile node (MN) 31 is connected to a network, i.e., a home network or a foreign network in the wireless LAN environment, from a packet transmitted by the access point (AP) 32 or 35, or the mobile node (MN) 31. More specifically, the MN connection detection unit 41 detects when the mobile node (MN) 31 is connected to the home network, by referring to the MAC address included in the packet transmitted by the access point (AP) 32 or 35, or the mobile node 31.

In a wireless LAN environment complying with the IEEE 802.11 standard, if the mobile node (MN) 31 moves into a wireless LAN, the mobile node (MN) 31 should go through an association process with the access point (AP) 32 or 35 managing the wireless LAN. Only after this is successfully completed can the mobile node (MN) 31 perform communication on the wireless LAN. At this time, the access point (AP) 32 or 35 broadcasts a logical link control (LLC) packet to nodes on a wired network. That is, the MN connection detection unit 41 detects whether or not the mobile node (MN) 31 is connected, from the LLC packet transmitted by the access point (AP) 32 or 35.

Referring back to FIG. 3, the MN connection detection unit 41 of the virtual mobile node (VMN) 34 detects whether or not the mobile node (MN) 31 is connected to the network based on the LLC packet transmitted by the access point (AP) 32 in the home network, when the mobile node (MN) 31 first tries to access the wireless LAN, and the network in which the mobile node (MN) 31 is currently positioned becomes the home network. In addition, the MN connection detection unit 41 of the virtual mobile node 34 also detects whether or not the mobile node (MN) 31 is connected to the network based on the LLC packet transmitted by the access point 35 in the foreign network, when the mobile node (MN) 31 moves out of the home network and tries to access the foreign network.

However, in other wireless LAN environments such as Bluetooth, or in a wired LAN environment, packets such as the LLC packet are not provided to the nodes on the wired network. Accordingly, in other wireless LAN environments such as Bluetooth or in a wired LAN environment, packets other than the LLC packet must be used to detect whether or not the mobile node (MN) 31 is connected to the network.

First, in the case where the user of the mobile node (MN) 31 transmits a packet, i.e., the mobile node (MN) 31 transmits a packet, the virtual mobile node (VMN) 34 in the home network, or the virtual mobile node (VMN) 37 in the foreign network can detect whether or not the mobile node (MN) 31 is connected thereto from the packet transmitted by the mobile node (MN) 31. In this case, the MN connection detection unit 41 detects whether or not the mobile node 31 is connected, from the packet transmitted by the mobile node (MN) 31.

Next, in the case where the user of the mobile node (MN) 31 receives a packet, i.e., the mobile node (MN) 31 receives a packet, the virtual mobile node (VMN) 34 in the home network, or the virtual mobile node (VMN) 37 in the foreign network must wait until a packet containing the MAC address of the mobile node (MN) 31 is received. One example of a packet containing the MAC address of the mobile node 31 is an address resolution protocol (ARP) packet deployed in accordance with an address resolution protocol (ARP) used to perform address resolution between IP addresses and various address, such as MAC address from an IP address. In this case, the MN connection detection unit 41 uses the ARP packet to detect whether or not the mobile node (MN) 31 is connected.

As previously noted, ARP is a protocol which can be used to find out the MAC address from an IP address. When a node knows the IP address, but not the MAC address of the mobile node (MN) 31, the node broadcasts an ARP request packet including the IP address of the mobile node (MN) 31. If the ARP request packet is broadcast by the node, the mobile node (MN) 31 transmits an ARP response packet including the MAC address of the mobile node (MN) 31 to the node. That is, the MN connection detection unit 41 uses the ARP response packet transmitted by the mobile node (MN) 31 to detect whether or not the mobile node (MN) 31 is connected.

As described above, the IP address and MAC address collected according to the ARP are stored in an ARP cache in each node, and are used to transmit the next packet. Generally, it is known that ARP packets to update the ARP cache are generated roughly every 30 seconds. Detecting at this frequency whether or not the mobile node (MN) 31 is connected does not matter in an environment which does not require fast hand-off, such as a wired LAN environment, but may matter in an environment requiring fast hand-off such as Bluetooth.

To solve this problem, in environments requiring fast hand-off such as Bluetooth, the mobile node (MN) 31 can further be implemented to incorporate an MN connection notification unit 311. Such a MN connection notification unit 311 can be programmed to periodically generate and broadcast an internet control message protocol (ICMP) packet indicating the MAC address of the mobile node (MN) 31. Since the MN connection notification unit 311 performs only a simple function to broadcast the ICMP packet, its installation can be much easier than the mobile IP function in the mobile node (MN) 31. Also, the size of the program for the MN connection notification unit 311 can be small. In addition, the function for broadcasting the ICMP packet can be easily imported to a variety of operating systems (OSs). In this case, the MN connection detection unit 41 uses the ICMP packet transmitted by the mobile node (MN) 31 to detect whether or not the mobile node (MN) 31 is connected.

If the connection of the mobile node (MN) 31 is detected by the MN connection detection unit 41, or if a request for information on the mobile node (MN) 31 is received by the MN information request reception unit 48, the MN information retrieval unit 42 searches the MN information cache 43 for information on the mobile node (MN) 31. In accordance with an embodiment of the present embodiment, information on the mobile node (MN) 31 includes the MAC address, COA, the home address of the mobile node (MN) 31, and the address of the home agent (HA) 33.

FIG. 5 is a diagram showing an example data storage format of the MN information cache 43 according to an embodiment of the present invention. The MN information cache 43 stores information on mobile nodes in the form of an MN information table shown in FIG. 5.

Referring to FIG. 5, the MN information table 50 according to an embodiment of the present embodiment includes an MN number entry 51, an MN attribute entry 52, a MAC address entry 53, a COA entry 54, a home address entry 55, a home agent (HA) address entry 56 and a time stamp entry 57.

In the MN number entry 51, a number identifying a mobile node (MN) is recorded. In the MN attribute entry 52, the attribute of a mobile node (MN) is recorded. In the MAC address entry 53, the MAC address of a mobile node (MN) is recorded. In the home address entry 55, the home address of a mobile node (MN) is recorded. In the home agent (HA) address entry 56, the address of the home agent (HA) of a mobile node (MN) is recorded. In the time stamp entry 57, the time when the home address (HA) is recorded in the home address entry is recorded.

In particular, "HS" recorded in the MN attribute entry 52 indicates that the network in which the virtual mobile node (VMN) 34 is located corresponds the home network of the mobile node (MN) 31, and the home address of the mobile node (MN) 31 is a static IP address. In contrast to the "HS" entry, "HD" indicates that the network in which the virtual mobile node (VMN) 34 is located corresponds to the home network of the mobile node (MN) 31, and the home address of the mobile node (MN) 31 is a dynamic IP address. "FO" indicates that the network in which the virtual mobile node (VMN) 37 is located corresponds to the foreign network of the mobile node (MN) 31, and the home address of the mobile node (MN) 31 is provided by another virtual mobile node (VMN) 34.

The time stamp entry 57 is used to efficiently manage the MN information cache 43. An information item is automatically deleted after a set time from its time stamp entry. This process will now be explained in more detail.

When the value recorded in the MN attribute entry 52 is "HS", this corresponds to the case where a home address is allocated to the mobile node (MN) 31 manually by a network administrator. Accordingly, regardless of the time recorded in the time stamp entry 57, unnecessary information must be manually deleted by the network administrator. When the value recorded in the MN attribute entry 52 is "HD", this corresponds to the case where a home address is allocated to the mobile node (MN) 31 using dynamic host configuration protocol (DHCP) which is a protocol by which the mobile node (MN) 31 obtains certain information needed to communication, such as an IP address. Considering that the average update interval of DHCP is 2-3 hours, an information item can be automatically deleted about 5 hours after it is recorded in a time stamp entry 57. If the value recorded in the MN attribute entry 52 is "FO", an information item can be automatically deleted 24 hours after it is recorded in a time stamp entry 57. However, when the mobile node (MN) 31 moves to another network and information transmitted to the mobile node (MN) 31 is received, the information can be deleted immediately. This is because the foreign agent (FA) 36 no longer needs to relay communication to the mobile node (MN) 31.

If information on the mobile node (MN) 31 is not retrieved in the MN information retrieval unit 42, the MN information request unit 44 requests information on the mobile node (MN) 31, i.e., MAC address, COA, home address of the mobile node (MN) 31, and address of the home agent (HA) 33, from the other virtual mobile nodes (VMNs). More specifically, by broadcasting an MN information request packet containing the MAC address of the mobile node (MN) 31, the MN information request unit 44 requests information on the mobile node (MN) 31, i.e., MAC address, COA, home address of the mobile node (MN) 31, and address of the home agent (HA) 33.

The response reception unit 45 receives a response to the request by the MN information request unit 44, and by using information included in this response, updates the MN information cache 43. The response includes the MAC address, COA, the home address of the mobile node (MN) 31, and the address of the home agent (HA) 33.

Referring back to FIG. 3, in the case where the MN information request unit 44 of the virtual mobile node (VMN) 34 in the home network requests information on the mobile node (MN) 34, when the mobile node (MN) 31 first tries to access a wireless LAN, the response reception unit 45 cannot receive any response from any node. Also, the case where the MN information request unit 44 of the virtual mobile node (VMN) 37 in the foreign network requests information on the mobile node (MN) 34, when the mobile node 31 moves out of the home network and is connected to a foreign network, the response reception unit 45 can receive a response from the virtual mobile node (VMN) 34.

If a response is received by the response reception unit 45, the response reception unit 45 records a new number in the MN number entry 51 of the MN information table 50, as shown in FIG. 5. Also, since the information included in the response is provided by another virtual mobile node (VMN), FO is recorded in the MN attribute entry 52. In the MAC address entry 53, the MAC address included in the response is recorded. In the COA entry 54, the COA included in the response is recorded. In the home address entry 55, the home address entry included in the response is recorded. In the home agent address entry 56, the home agent address included in the response is recorded. In the time stamp entry 57, the time when the home address was recorded in the home address entry is recorded.

If there is no response to the request by the MN information request unit 44, the waiting unit 46 waits until information on the mobile node (MN) 31 is obtained, and by using the obtained information, updates the MN information cache 43. However, the case where the waiting unit 46 obtains information on the mobile node (MN) 31 after waiting corresponds to the case where the mobile node (MN) 31 first tries to access a wireless LAN through the access point (AP) 32, and the network in which the mobile node (MN) 31 is currently located becomes the home network.

More specifically, if information requested by the MN information request unit 44 is not stored in the MN information cache of the other virtual mobile node (VMN) 34 or 37, the waiting unit 46 must wait until a home address is allocated to the mobile node (MN) 31 manually by the network administrator, or alternatively, automatically by DHCP. Also, the waiting unit 46 must wait until the address of the home agent (HA) 33 is obtained from the home agent (HA) 33. Since the home agent (HA) 33 periodically broadcasts an agent advertisement message including its IP address, the waiting unit 46 can obtain the address of the home agent (HA) 33 before the home address is obtained.

If information on the mobile node 31 is obtained by the waiting unit 46 after waiting, the waiting unit 46 records a new number in the MN number entry 51 of the MN information table 50, as shown in FIG. 5. Also, since the network in which the mobile node (MN) 31 is currently located is the home network, HS or HD is recorded in the MN attribute entry 52. In the MAC address entry 53, the MAC address included in an LLC packet, an ARP packet or an ICMP packet is recorded. In the COA entry 54, nothing is recorded, because the COA cannot exist since the mobile node (MN) 31 is currently located in the home network. In the home address entry 55, the home address obtained by the waiting unit 46 after the waiting is recorded. In the home agent address entry 56, the home agent address obtained by the waiting unit 46 after the waiting is recorded. In the time stamp entry 57, the time when the home address was recorded in the home address entry is recorded.

The MN information registration unit 47 registers with the home agent (HA) 33 information retrieved by the MN information retrieval unit 42, information included in the response received by the response reception unit 45, or information obtained by the waiting unit 46 after waiting. More specifically, in order for the home agent (HA) 33 to perform tunneling of a packet with a destination set to the home address by the correspondent node (CN) 38, by setting the COA as the destination, the MN information registration unit 43 binds the home address and the COA of the mobile node (MN) 31 and registers the binding result on behalf of the mobile node (MN) 31. However, when the MN information registration unit 43 registers with the home agent (HA) 33 the information obtained by the waiting unit 46 as a result of waiting, the IP address of the mobile node (MN) 31 is registered first as the home address.

The MN information request reception unit 48 receives a request for information on the mobile node (MN) 31 from other virtual mobile nodes. More specifically, if another virtual mobile node does not obtain information on the mobile node (MN) 31 from the MN information cache of the other virtual mobile node, it broadcasts an MN information request packet. At this time, the MN information request reception unit 48 receives a request for information on the mobile node (MN) 31, through this MN information request packet.

If information on the mobile node (MN) 31 is retrieved by the MN information retrieval unit 42, the response transmission unit 49 transmits a response including information on the mobile node 31, i.e., MAC address, COA, home address of the mobile node (MN) 31, and address of the home agent (HA) 33, to the virtual mobile node (VMN) which transmitted the request.

Figure 6:
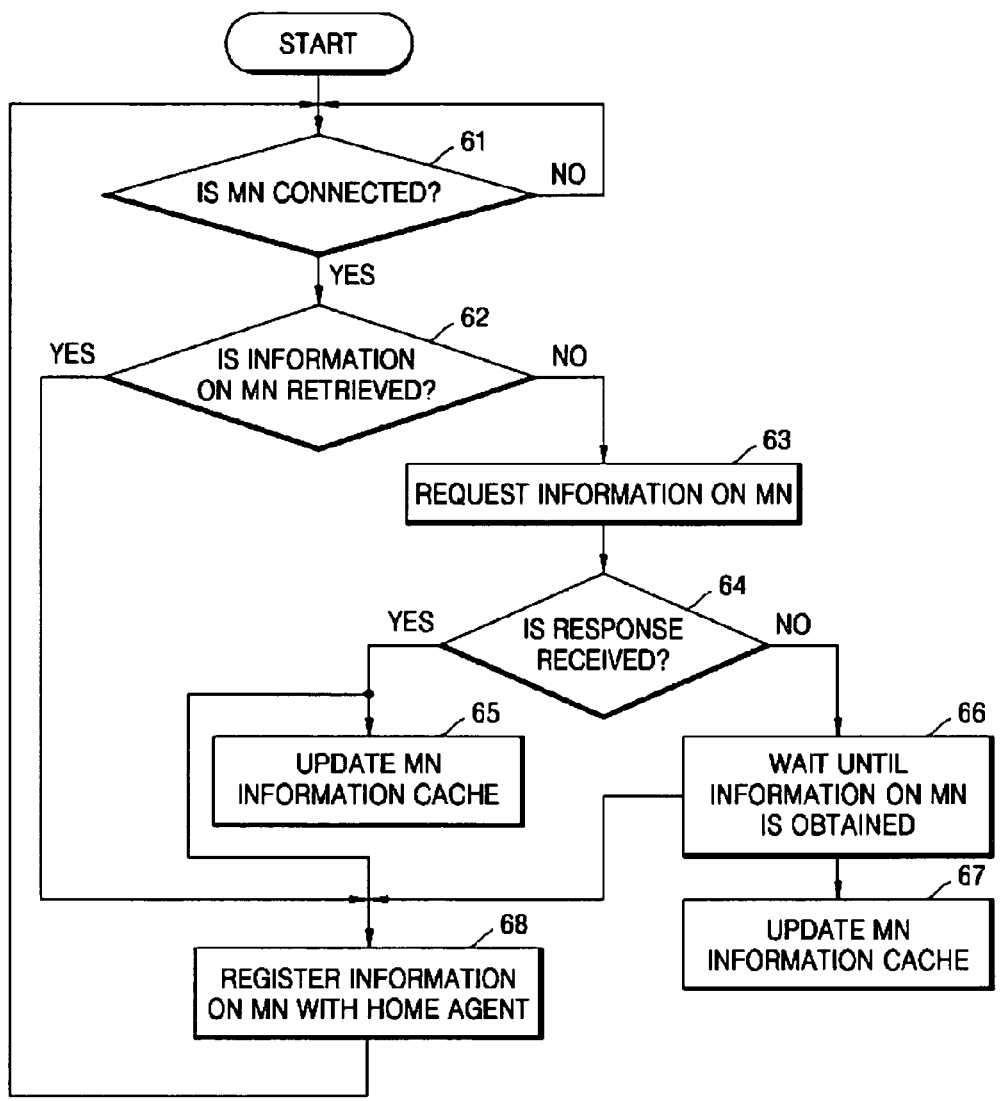
FIG. 6 is a flowchart of the operations performed by a method for registering a mobile node at a virtual mobile node according to an example embodiment of the present invention.

FIG. 6 is a flowchart of the operations performed by a method for registering a mobile node at a virtual mobile node (VMN) according to an embodiment of the present invention.

Referring to FIG. 6, the operations of the method for registering a mobile node according to the present embodiment will now be explained. The method for registering a mobile node according to the present embodiment includes operations processed sequentially in the virtual mobile node (VMN) 34 in the home network, or the virtual mobile node (VMN) 37 in the foreign network, as shown in FIG. 4. Accordingly, though any part is omitted in the following explanation, if the part is explained above with reference to the virtual mobile node (VMN) 34 or 37, it is also applied to the method for registering a mobile node according to the present embodiment.

In operation 61, from a packet transmitted by an access point (AP) 32 in the home network, or an access point (AP) 35 in the foreign network, or the mobile node (MN) 31, the corresponding virtual mobile node (VMN) 34 in the home network or the virtual mobile node (VMN) 37 in the foreign network detects whether or not the mobile node (MN) 31 is connected thereto.

If the mobile node (MN) 31 is found to be connected in operation 61, the virtual mobile node (VMN) 34 or 37 searches the MN information cache 43 for information on the mobile node (MN) 31, i.e., MAC address, COA, home address of the mobile node (MN) 31, and address of the home agent (HA) 33, and determines if the information on the mobile node (MN) 31 is retrieved, in operation 62.

If information on the mobile node (MN) 31 is not retrieved in operation 62, the virtual mobile node (VMN) 34 or 37 requests other virtual mobile nodes for information on the mobile node (MN) 31 in operation 63.

In operation 64, the virtual mobile node (VMN) 34 or 37 receives a response to the request made in operation 63.

If the virtual mobile node (VMN) 34 or 37 receives a response in operation 64, the virtual mobile node (VMN) 34 or 37 updates the MN information cache 43 by using information included in this response, in operation 65.

If a response is not received in operation 64, the virtual mobile node (VMN) 34 or 37 waits until information on the mobile node (MN) 31 is obtained in operation 66.

In operation 67, the virtual mobile node (VMN) 34 or 37 updates the MN information cache 43 by using the information obtained in operation 66.

In operation 68, if information on the mobile node (MN) 31 is retrieved in operation 62, the virtual mobile node (VMN) 34 or 37 registers this information in the home agent (HA) 33. Alternatively, if a response is received in operation 64, the virtual mobile node (VMN) 34 or 37 registers information included in this response with the home agent (HA) 33, or registers information obtained in operation 66, with the home agent (HA) 33.

Figure 7:
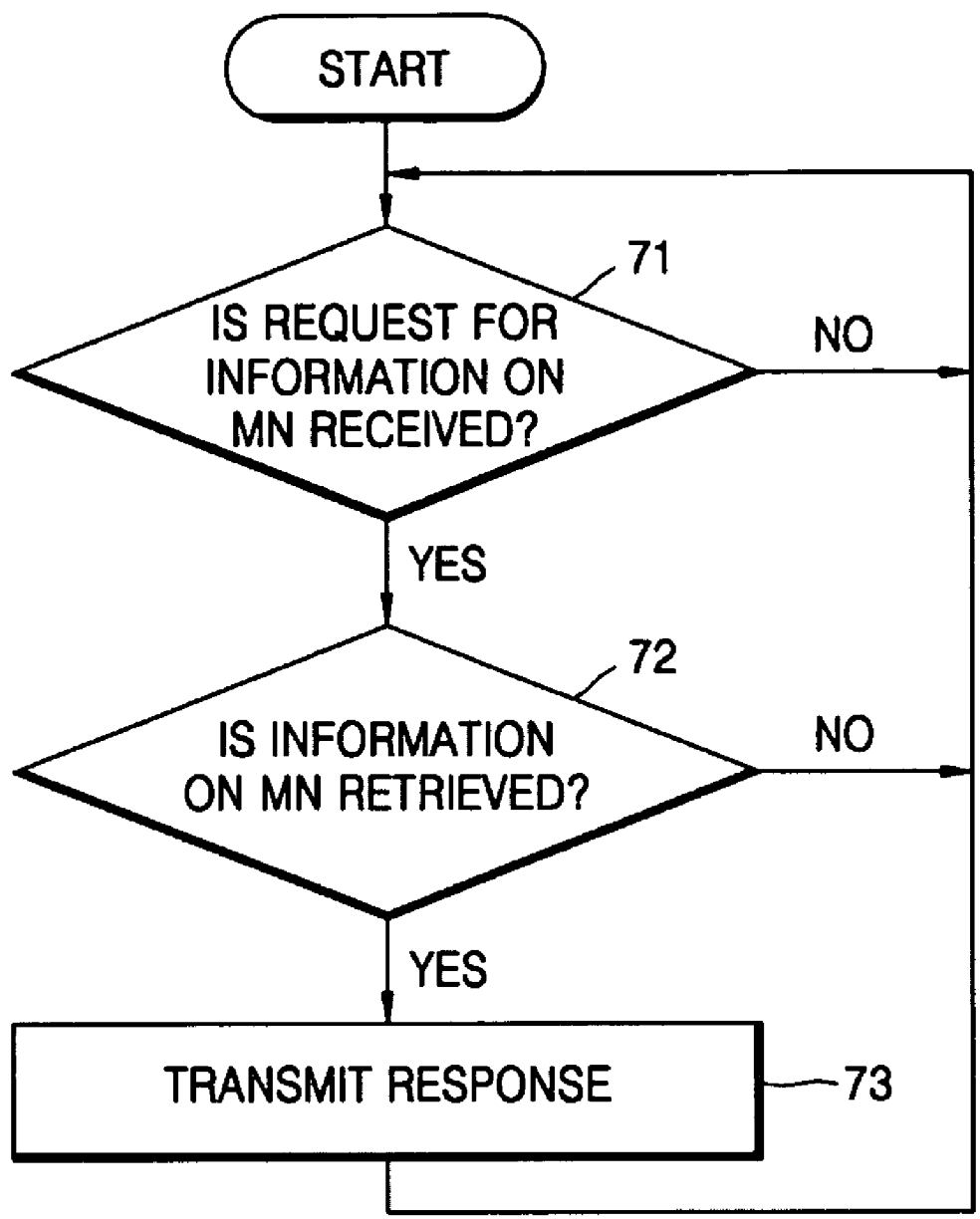
FIG. 7 is a flowchart of the operations performed by a method for providing mobile node information at a virtual mobile node according to an example embodiment of the present invention.

FIG. 7 is a flowchart of the operations performed by a method for providing mobile node information according to an embodiment of the present invention.

Referring to FIG. 7, the operations of the method for providing mobile node information according to the present embodiment will now be explained. The method for providing mobile node information according to the present invention includes operations processed sequentially in the virtual mobile node (VMN) 34 or 37, as shown in FIG. 4. Accordingly, though any part is omitted in the following explanation, if the part is explained above with reference to the virtual mobile node (VMN) 34 or 37, it is also applied to the method for providing mobile node information according to the present embodiment.

In operation 71, the virtual mobile node (VMN) 34 or 37 receives a request for information on the mobile node (MN) 31 from another virtual mobile node.

If the request for information on the mobile node (MN) 31 is received in operation 71, the virtual mobile node (VMN) 34 or 37 searches the MN information cache 43 for information on the mobile node (MN) 31 and determines if the information on the mobile node (MN) 31 is retrieved, in operation 72.

If the information on the mobile node (MN) 31 is retrieved in operation 72, the virtual mobile node (VMN) 34 or 37 transmits a response including the information on the mobile node (MN) 31 to the other virtual mobile node, in operation 73.

As described from the foregoing, the present invention advantageously provides a virtual mobile node (VMN) to perform the mobile IP function of a mobile node (MN) on behalf of the mobile node (MN). As a result, even if a mobile IP module is not installed in the mobile node (MN), the mobile node (MN) can still perform wireless communications seamless among a plurality of networks utilizing mobile IP. Existing mobile IP can be utilized without additional modifications. Moreover, a foreign agent (FA) does not need to periodically perform agent advertisement to distribute network information to the mobile node (MN), which can advantageously prevent unnecessary data traffic in the network.

Various components of the virtual mobile node (VMN), as shown in FIG. 4 and methods of registering a mobile node (MN) or providing mobile node (MN) information, as shown in FIG. 6 and FIG. 7, can be implemented in software or hardware, such as, for example, an application specific integrated circuit (ASIC) or printed circuit board (PCB). As such, it is intended that the processes described herein be broadly interpreted as being equivalently performed by software, hardware, or a combination thereof. Software modules can be written, via a variety of software languages, including C, C++, Java, Visual Basic, and many others. The various software modules may also be integrated in a single application executed on various types of wireless cards. These software modules may include data and instructions which can also be stored on one or more machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Instructions of the software routines or modules may also be loaded or transported into the wireless cards or any computing devices on the wireless network in one of many different ways. For example, code segments including instructions stored on floppy discs, CD or DVD media, a hard disk, or transported through a network interface card, modem, or other interface device may be loaded into the node and executed as corresponding software routines or modules. In the loading or transport process, data signals that are embodied as carrier waves (transmitted over telephone lines, network lines, wireless links, cables, and the like) may communicate the code segments, including instructions, to the network node or element. Such carrier waves may be in the form of electrical, optical, acoustical, electromagnetic, or other types of signals.

While there have been illustrated and described what are considered to be example embodiments of the present invention, it will be understood by those skilled in the art and as technology develops that various changes and modifications, may be made, and equivalents may be substituted for elements thereof without departing from the true scope of the present invention. Many modifications, permutations, additions and sub-combinations may be made to adapt the teachings of the present invention to a particular situation without departing from the scope thereof. For example, the components of the virtual mobile node (VMN), as shown in FIG. 4, can be implemented in a single hardware or firmware stalled at an existing wireless node to perform the functions as described. In addition, the wireless network can be provided with compatible communication protocols usable for wireless transmission as specified by IEEE 802.11a, 802.11b and/ or 802.11g standards, Bluetooth standards, other emerging wireless technologies such as Wi-Max. Moreover, alternative embodiments of the invention can be implemented as a computer program product for use with a computer system. Such a computer program product can be, for example, a series of computer instructions stored on a tangible data recording medium, such as a diskette, CD-ROM, ROM, or fixed disk. The series of computer instructions can constitute all or part of the functionality described above, and can also be stored in any memory device, volatile or non-volatile, such as semiconductor, magnetic, optical or other memory device. Furthermore, the software modules can also be machine-readable storage media, such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact discs (CDs) or digital video discs (DVDs). Lastly, the virtual mobile node (VMN) can also be implemented in a single ASIC chip. Accordingly, it is intended, therefore, that the present invention not be limited to the various example embodiments disclosed, but that the present invention includes all embodiments falling within the scope of the appended claims.

What is claimed is:

1. A method for registering a mobile node for operation in wireless networks comprising:
   detecting whether a mobile node which travels among a plurality of networks is connected; and
   registering information on the mobile node whose connection is detected, on behalf of the mobile node, in an agent which relays communication between the mobile node and a correspondent agent located in one of the networks.

2. The method as claimed in claim 1, wherein the information on the mobile node includes an internet protocol (IP) address in a home network of the mobile node and an IP address in a foreign network, and wherein the agent performs tunneling a packet with a destination set to the IP address in the home network by the correspondent agent, by setting the IP address in the foreign network as the destination.

3. The method as claimed in claim 2, wherein, during registration of the information on the mobile node, the IP address in the home network and the IP address in the foreign network of the mobile node are bound and the binding result is registered on behalf of the mobile node.

4. The method as claimed in claim 1, wherein, during detection of whether the mobile node is connected, a packet transmitted by either an access point connecting the mobile node and the agent, or the mobile node, is used to detect whether the mobile node is connected.

5. The method as claimed in claim 4, wherein, during detection of whether the mobile node is connected, a logical link control (LLC) packet transmitted by the access point, an address resolution protocol (ARP) packet, or an internet control message protocol (ICMP) packet transmitted by the mobile node, is used to detect whether the mobile node is connected.

6. A method for registering a mobile node for operation in wireless networks, comprising:
   detecting whether a mobile node which travels among a plurality of networks is connected;
   searching a cache for information on the mobile node whose connection is detected, and retrieving information on the mobile node from the cache; and
   registering the information on the mobile node whose connection is detected, as retrieved from the cache, on behalf of the mobile node, with an agent which relays communication between the mobile node and a corresponding agent located in one of the networks.

7. The method as claimed in claim 6, further comprising:
   if the information on the mobile node is not retrieved, requesting the information from a plurality of nodes located on the networks; and
   receiving a response to the request from one of the plurality of nodes located on the networks, and registering the information on the mobile node included in the response to the request with the agent relaying communication between the mobile node and the corresponding agent located in one of the networks.

8. The method as claimed in claim 7, further comprising:
   if there is no response to the request, waiting until the information is obtained; and
   registering the information on the mobile node obtained as a result of the waiting with the agent relaying communication between the mobile node and the corresponding agent located in one of the networks.

9. An apparatus for registering a mobile node for operation in wireless networks, comprising:
   a detection unit which detects whether a mobile node traveling among a plurality of networks is connected; and
   a registration unit which registers information on the mobile node whose connection is detected by the detection unit, on behalf of the mobile node, with an agent relaying communication between the mobile node and a correspondent agent located in one of the networks.

10. The apparatus as claimed in claim 9, wherein the information on the mobile node includes an internet protocol (IP) address in a home network of the mobile node, and an IP address in a foreign network, and wherein the agent performs tunneling of a packet with a destination set to the IP address in the home network by the correspondent agent, by setting the IP address in the foreign network as the destination.

11. The apparatus as claimed in claim 10, wherein the registration unit binds the IP address in the home network and the IP address in the foreign network of the mobile node, and registers the binding result, on behalf of the mobile node.

12. The apparatus as claimed in claim 11, wherein the detection unit detects whether the mobile node is connected, from a packet transmitted by an access point connecting the mobile node and the agent or by the mobile node.

13. The apparatus as claimed in claim 12, wherein the detection unit detects whether the mobile node is connected, using a logical link control (LLC) packet transmitted by the access point, an address resolution protocol (ARP) packet, or an internet control message protocol (ICMP) packet transmitted by the mobile node.

14. The apparatus as claimed in claim 9, further comprising:
   a retrieval unit which searches a cache for information on the mobile node whose connection is detected by the detection unit,
   wherein the registration unit registers the information on the mobile node retrieved by the retrieval unit with the agent relaying communication between the mobile node and the correspondent agent located in one of the networks.

15. The apparatus as claimed in claim 9, further comprising:
   a retrieval unit which searches a cache for information on the mobile node whose connection is detected by the detection unit;

a request unit which requests the information from a plurality of nodes located on the networks, if the information is not retrieved by the retrieval unit, and wherein the registration unit registers information on the mobile node included in a response to the request by the request unit with the agent relaying communication between the mobile node and the correspondent agent located in one of the networks.

16. The apparatus as claimed in claim 15, further comprising:

a waiting unit which waits until the information is obtained, if there is no response to the request by the requesting unit, and wherein the registration unit registers information obtained as a result of the waiting by the waiting unit with the agent relaying communication between the mobile node and the correspondent agent located in one of the networks.

17. A computer readable recording medium having embodied thereon a computer program for execution by a host which, when executed by the host, performs:

detecting whether a mobile node traveling among a plurality of networks is connected;

searching a cache inside the host for information on the mobile node whose connection is detected; and registering information on the mobile node whose connection is detected, on behalf of the mobile node with an agent relaying communication between the mobile node and a correspondent agent located in one of the networks.

18. A wireless network environment deploying mobile IP, comprising:

a distribution system;

a first network including at least a wireless access point (AP) and a routing agent arranged in communication with the distribution system, each wireless AP supporting at least a mobile node to transmit and receive wireless information; and a second network including at least a wireless access point (AP) and a routing agent arranged in communication with the distribution system, each wireless AP supporting at least a mobile node to transmit and receive wireless information;

wherein each of the first network and the second network is provided with a virtual mobile node mechanism to perform mobile IP functions of the mobile node on behalf of the mobile node as the mobile node moves between the first network and the second network, while maintaining any ongoing wireless communications without interruption.

19. The wireless network environment deploying mobile IP as claimed in claim 18, wherein the virtual mobile node mechanism and the routing agent are implemented in a single node connected to the distribution system and the wireless AP, and wherein the virtual mobile node mechanism comprises:

a detection unit which detects whether the mobile node traveling between the networks is connected; and a registration unit which registers information on the mobile node whose connection is detected by the detection unit, with the routing agent relaying communication between the mobile node and the correspondent agent located in the other network.

20. The wireless network environment deploying mobile IP as claimed in claim 19, wherein the information on the mobile node includes an internet protocol (IP) address in the first network, and an IP address in the second network, and wherein the routing agent performs tunneling of packets with a destination set to the IP address in the first network by the correspondent routing agent, by setting the IP address in the second network as the destination.

21. The wireless network environment deploying mobile IP as claimed in claim 20, wherein the registration unit binds the IP address in the first network and the IP address in the second network of the mobile node, and registers the binding result, on behalf of the mobile node, at the corresponding routing agent.

22. The wireless network environment deploying mobile IP as claimed in claim 21, wherein the detection unit detects whether the mobile node is connected, based on a logical link control (LLC) packet transmitted by the wireless AP, an address resolution protocol (ARP) packet, or an internet control message protocol (ICMP) packet transmitted by the mobile node.

23. The wireless network environment deploying mobile IP as claimed in claim 20, wherein the virtual mobile node mechanism further comprises:

a retrieval unit which searches a cache for information on the mobile node whose connection is detected by the detection unit, and wherein the registration unit registers the information on the mobile node retrieved by the retrieval unit with the routing agent relaying communication between the mobile node and the correspondent routing agent located in the other network.

24. The wireless network environment deploying mobile IP as claimed in claim 20, wherein the virtual mobile node mechanism further comprises:

a request unit which requests the information on the mobile node from a plurality of nodes located on the networks, if the information is not retrieved by the retrieval unit, and wherein the registration unit registers information on the mobile node included in a response to the request by the request unit with the routing agent relaying communication between the mobile node and the correspondent routing agent located in the other network.

25. The wireless network environment deploying mobile IP as claimed in claim 24, wherein the virtual mobile node mechanism further comprises:

a waiting unit which waits until the information is obtained, if there is no response to the request by the requesting unit, wherein the registration unit registers information obtained as a result of the waiting by the waiting unit with the routing agent relaying communication between the mobile node and the correspondent routing agent located in the other network.

26. A virtual mobile node provided at a routing agent installed in each of first and second networks along with an access point (AP) to support mobile IP functions of a mobile node as the mobile node moves between the first network and the second network, while maintaining ongoing wireless communications without interruption, the virtual mobile node comprising:

a detection unit which detects whether the mobile node traveling between the first and second networks is connected;

a retrieval unit which searches a cache for information on the mobile node whose connection is detected by the detection unit; and a registration unit which registers information on the mobile node, with the routing agent to relay communication between the mobile node and the correspondent routing agent located in the second network.

27. The virtual mobile node as claimed in claim 26, wherein the information on the mobile node includes an internet protocol (IP) address of the first network, and an IP address of the second network, and wherein the routing agent performs tunneling of packets with a destination set to the IP address in the first network by the correspondent routing agent, by setting the IP address in the second network as the destination.

28. The virtual mobile node as claimed in claim 26, wherein the registration unit binds the IP address in the first network and the IP address in the second network, and registers the binding result, on behalf of the mobile node, at the corresponding routing agent.

29. The virtual mobile node as claimed in claim 26, wherein the detection unit detects whether the mobile node is connected, based on a logical link control (LLC) packet transmitted by the wireless AP, an address resolution protocol (ARP) packet, or an internet control message protocol (ICMP) packet transmitted by the mobile node.

30. The virtual mobile node as claimed in claim 26, further comprising:
 a retrieval unit which searches a cache for information on the mobile node whose connection is detected by the detection unit;
 a request unit which requests the information on the mobile node from a plurality of nodes located on the networks, if the information on the mobile node is not retrieved by the retrieval unit; and
 a waiting unit which waits until the information is obtained, if there is no response to the request by the requesting unit,
 wherein the registration unit registers the information on the mobile node retrieved by the retrieval unit, included in a response to the request by the request unit, or obtained as a result of the waiting by the waiting unit, with the routing agent relaying communication between the mobile node and the correspondent routing agent located in the second network.

* * * * *